United States Patent
Morgan et al.

(10) Patent No.: US 7,762,329 B1
(45) Date of Patent: Jul. 27, 2010

(54) METHODS FOR SERVICING WELL BORES WITH HARDENABLE RESIN COMPOSITIONS

(75) Inventors: Rickey Lynn Morgan, Duncan, OK (US); D. Chad Brenneis, Marlow, OK (US); Jeffery Karcher, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 12/360,562

(22) Filed: Jan. 27, 2009

(51) Int. Cl.
*E21B 33/138* (2006.01)
*C09K 8/44* (2006.01)
*C09K 8/50* (2006.01)

(52) U.S. Cl. .................. 166/295; 166/285; 507/219; 507/220; 507/269

(58) Field of Classification Search ................ 166/285, 166/294, 295; 175/72; 507/219, 220, 269
See application file for complete search history.

(56) References Cited

U.S. PATENT DOCUMENTS

| | | | |
|---|---|---|---|
| 2,238,671 A | 4/1941 | Woodhouse | |
| 2,703,316 A | 3/1955 | Schneider | |
| 2,869,642 A | 1/1959 | McKay et al. | |
| 3,047,067 A | 7/1962 | Williams et al. | |
| 3,052,298 A | 9/1962 | Malott | |
| 3,070,165 A | 12/1962 | Stratton | |
| 3,123,138 A | 3/1964 | Robichaux | |
| 3,173,484 A | 3/1965 | Huitt et al. | |
| 3,176,768 A | 4/1965 | Brandt et al. | |
| 3,195,635 A | 7/1965 | Fast | |
| 3,199,590 A | 8/1965 | Young | |
| 3,272,650 A | 9/1966 | MacVittie | |
| 3,297,086 A | 1/1967 | Spain | |
| 3,302,719 A | 2/1967 | Fischer | |
| 3,308,885 A | 3/1967 | Sandiford | |
| 3,308,886 A | 3/1967 | Evans | |
| 3,316,965 A | 5/1967 | Watanabe | |
| 3,329,204 A | 7/1967 | Brieger | |
| 3,336,980 A | 8/1967 | Rike | |
| 3,364,995 A | 1/1968 | Atkins et al. | |
| 3,366,178 A | 1/1968 | Malone et al. | |
| 3,372,752 A * | 3/1968 | Prater ..................... | 166/308.1 |
| 3,375,872 A | 4/1968 | McLaughlin et al. | |
| 3,378,074 A | 4/1968 | Kiel | |
| 3,404,735 A | 10/1968 | Young et al. | |
| 3,415,320 A | 12/1968 | Young | |
| 3,455,390 A | 7/1969 | Gallus | |
| 3,478,824 A | 11/1969 | Hess et al. | |
| 3,481,403 A | 12/1969 | Gidley et al. | |
| 3,489,222 A | 1/1970 | Millhone et al. | |
| 3,492,147 A | 1/1970 | Young et al. | |
| 3,525,398 A | 8/1970 | Fisher | |
| 3,565,176 A | 2/1971 | Clifford | |
| 3,592,266 A | 7/1971 | Tinsley | |
| 3,659,651 A | 5/1972 | Graham | |
| 3,681,287 A | 8/1972 | Brown et al. | |
| 3,708,013 A | 1/1973 | Dismukes | |
| 3,709,298 A | 1/1973 | Pramann | |
| 3,709,641 A | 1/1973 | Sarem | |
| 3,718,189 A * | 2/1973 | Terry ..................... | 166/305.1 |
| 3,741,308 A | 6/1973 | Veley | |
| 3,754,598 A | 8/1973 | Holloway, Jr. | |
| 3,765,804 A | 10/1973 | Brandon | |
| 3,768,564 A | 10/1973 | Knox et al. | |
| 3,769,070 A | 10/1973 | Schilt | |
| 3,784,585 A | 1/1974 | Schmitt et al. | |
| 3,819,525 A | 6/1974 | Hattenbrun | |
| 3,842,911 A | 10/1974 | Knox et al. | |
| 3,850,247 A | 11/1974 | Tinsley | |
| 3,854,533 A | 12/1974 | Gurley et al. | |
| 3,857,444 A | 12/1974 | Copeland | |
| 3,861,467 A | 1/1975 | Harnsberger | |
| 3,863,709 A | 2/1975 | Fitch | |

(Continued)

FOREIGN PATENT DOCUMENTS

CA      2063877      9/1992

(Continued)

OTHER PUBLICATIONS

U.S. Appl. No. 12/080,647, filed Apr. 4, 2008, Dalrymple et al.

(Continued)

*Primary Examiner*—George Suchfield
(74) *Attorney, Agent, or Firm*—Craig W. Roddy; McDermott, Will & Emery, LLP

(57) ABSTRACT

Methods for servicing well bores with hardenable resin compositions are provided. In one embodiment, a method of servicing a well bore includes providing a hydrophobic well bore servicing composition comprising a liquid hardenable resin, a hardening agent, and a weighting material selected to impart a desired first density to the well bore servicing composition; introducing the well bore servicing composition into a well bore comprising a well bore fluid having a second density; allowing the well bore servicing composition to migrate through the well bore fluid to a desired location in the well bore based at least in part upon a difference between the first and second densities; and allowing the liquid hardenable resin to at least partially harden to form a well bore plug at the desired location in the well bore.

13 Claims, No Drawings

U.S. PATENT DOCUMENTS

| | | | |
|---|---|---|---|
| 3,888,311 A | 6/1975 | Cooke, Jr. | |
| 3,912,692 A | 10/1975 | Casey et al. | |
| 3,933,205 A | 1/1976 | Kiel | |
| 3,948,672 A | 4/1976 | Harnsberger | |
| 3,955,993 A | 5/1976 | Curtice et al. | |
| 3,960,801 A | 6/1976 | Cole et al. | |
| 4,000,781 A | 1/1977 | Knapp | |
| 4,008,763 A | 2/1977 | Lowe, Jr. | |
| 4,015,995 A | 4/1977 | Hess | |
| 4,018,285 A | 4/1977 | Watkins et al. | |
| 4,029,148 A | 6/1977 | Emery | |
| 4,031,958 A | 6/1977 | Sandiford et al. | |
| 4,042,032 A | 8/1977 | Anderson et al. | |
| 4,060,988 A | 12/1977 | Arnold | |
| 4,068,718 A | 1/1978 | Cooke, Jr. et al. | |
| 4,070,865 A | 1/1978 | McLaughlin | |
| 4,074,760 A | 2/1978 | Copeland et al. | |
| 4,085,801 A | 4/1978 | Sifferman et al. | |
| 4,085,802 A | 4/1978 | Sifferman et al. | |
| 4,089,437 A | 5/1978 | Chutter et al. | |
| 4,127,173 A | 11/1978 | Watkins et al. | |
| 4,189,002 A | 2/1980 | Martin | |
| 4,245,702 A | 1/1981 | Haafkens et al. | |
| 4,247,430 A | 1/1981 | Constien | |
| 4,259,205 A | 3/1981 | Murphey | |
| 4,273,187 A | 6/1981 | Satter et al. | |
| 4,275,788 A * | 6/1981 | Sweatman | 166/292 |
| 4,291,766 A | 9/1981 | Davies et al. | |
| 4,305,463 A | 12/1981 | Zakiewicz | |
| 4,336,842 A | 6/1982 | Graham et al. | |
| 4,352,674 A | 10/1982 | Fery | |
| 4,353,806 A | 10/1982 | Canter et al. | |
| 4,392,988 A | 7/1983 | Dobson et al. | |
| 4,399,866 A | 8/1983 | Dearth | |
| 4,415,805 A | 11/1983 | Fertl et al. | |
| 4,428,427 A | 1/1984 | Friedman | |
| 4,439,489 A | 3/1984 | Johnson et al. | |
| 4,441,556 A | 4/1984 | Powers et al. | |
| 4,443,347 A | 4/1984 | Underdown et al. | |
| 4,445,575 A * | 5/1984 | Perkins | 166/290 |
| 4,460,052 A | 7/1984 | Gockel | |
| 4,489,785 A | 12/1984 | Cole | |
| 4,493,875 A | 1/1985 | Beck et al. | |
| 4,494,605 A | 1/1985 | Wiechel et al. | |
| 4,498,995 A | 2/1985 | Gockel et al. | |
| 4,501,328 A | 2/1985 | Nichols | |
| 4,527,627 A | 7/1985 | Graham et al. | |
| 4,541,489 A | 9/1985 | Wu | |
| 4,546,012 A | 10/1985 | Brooks | |
| 4,553,596 A | 11/1985 | Graham et al. | |
| 4,564,459 A | 1/1986 | Underdown et al. | |
| 4,572,803 A | 2/1986 | Yamazoe et al. | |
| 4,585,064 A | 4/1986 | Graham et al. | |
| 4,649,998 A | 3/1987 | Friedman | |
| 4,662,449 A * | 5/1987 | Friedman | 166/295 |
| 4,664,819 A | 5/1987 | Glaze et al. | |
| 4,665,988 A | 5/1987 | Murphey et al. | |
| 4,669,543 A | 6/1987 | Young | |
| 4,670,501 A | 6/1987 | Dymond et al. | |
| 4,675,140 A | 6/1987 | Sparks et al. | |
| 4,681,165 A | 7/1987 | Bannister | |
| 4,683,954 A | 8/1987 | Walker et al. | |
| 4,694,905 A | 9/1987 | Armbruster | |
| 4,733,729 A | 3/1988 | Copeland | |
| 4,739,832 A | 4/1988 | Jennings, Jr. et al. | |
| 4,772,646 A | 9/1988 | Harms et al. | |
| 4,777,200 A | 10/1988 | Dymond et al. | |
| 4,785,884 A | 11/1988 | Armbruster | |
| 4,787,453 A | 11/1988 | Hewgill et al. | |
| 4,789,105 A | 12/1988 | Hosokawa et al. | |
| 4,796,701 A | 1/1989 | Hudson et al. | |
| 4,797,262 A | 1/1989 | Dewitz | |
| 4,800,960 A | 1/1989 | Friedman et al. | |
| 4,817,719 A * | 4/1989 | Jennings, Jr. | 166/292 |
| 4,829,100 A | 5/1989 | Murphey et al. | |
| 4,838,352 A | 6/1989 | Oberste-Padtberg et al. | |
| 4,842,070 A | 6/1989 | Sharp | |
| 4,842,072 A | 6/1989 | Friedman et al. | |
| 4,846,118 A | 7/1989 | Slattery et al. | |
| 4,848,470 A | 7/1989 | Korpics | |
| 4,850,430 A | 7/1989 | Copeland et al. | |
| 4,875,525 A | 10/1989 | Mana | |
| 4,886,354 A | 12/1989 | Welch et al. | |
| 4,888,240 A | 12/1989 | Graham et al. | |
| 4,892,147 A | 1/1990 | Jennings, Jr. et al. | |
| 4,895,207 A | 1/1990 | Friedman et al. | |
| 4,898,750 A | 2/1990 | Friedman et al. | |
| 4,903,770 A | 2/1990 | Friedman et al. | |
| 4,921,047 A | 5/1990 | Summers et al. | |
| 4,921,576 A | 5/1990 | Hurd | |
| 4,931,490 A * | 6/1990 | Armeniades | 523/218 |
| 4,934,456 A | 6/1990 | Moradi-Araghi | |
| 4,936,385 A | 6/1990 | Weaver et al. | |
| 4,942,186 A | 7/1990 | Murphey et al. | |
| 4,969,522 A | 11/1990 | Whitehurst et al. | |
| 4,969,523 A | 11/1990 | Martin et al. | |
| 4,984,635 A | 1/1991 | Cullick et al. | |
| 5,004,298 A * | 4/1991 | Boulanger et al. | 299/5 |
| 5,030,603 A | 7/1991 | Rumpf et al. | |
| 5,049,743 A | 9/1991 | Taylor, III et al. | |
| 5,056,597 A | 10/1991 | Stowe, III et al. | |
| 5,082,056 A | 1/1992 | Tackett, Jr. et al. | |
| 5,095,987 A | 3/1992 | Weaver et al. | |
| 5,105,886 A | 4/1992 | Strubhar et al. | |
| 5,107,928 A | 4/1992 | Hilterhaus | |
| 5,128,390 A | 7/1992 | Murphey et al. | |
| 5,135,051 A | 8/1992 | Facteau et al. | |
| 5,165,438 A | 11/1992 | Facteau et al. | |
| 5,173,527 A | 12/1992 | Calve et al. | |
| 5,178,218 A | 1/1993 | Dees | |
| 5,182,051 A | 1/1993 | Bandy et al. | |
| 5,199,491 A | 4/1993 | Kutta et al. | |
| 5,199,492 A | 4/1993 | Surles et al. | |
| 5,211,234 A | 5/1993 | Floyd | |
| 5,218,038 A | 6/1993 | Johnson et al. | |
| 5,232,955 A | 8/1993 | Csabai et al. | |
| 5,232,961 A | 8/1993 | Murphey et al. | |
| 5,238,068 A | 8/1993 | Fredrickson et al. | |
| 5,244,362 A | 9/1993 | Conally et al. | |
| 5,249,627 A | 10/1993 | Harms et al. | |
| 5,249,628 A * | 10/1993 | Surjaatmadia | |
| 5,256,729 A | 10/1993 | Kutta et al. | |
| 5,265,678 A | 11/1993 | Grundmann | |
| 5,273,115 A | 12/1993 | Spafford | |
| 5,278,203 A | 1/1994 | Harms | |
| 5,285,849 A | 2/1994 | Surles et al. | |
| 5,293,939 A | 3/1994 | Surles et al. | |
| 5,295,542 A | 3/1994 | Cole et al. | |
| 5,320,171 A | 6/1994 | Laramay | |
| 5,321,062 A | 6/1994 | Landrum et al. | |
| 5,325,923 A | 7/1994 | Surjaatmadja et al. | |
| 5,330,005 A | 7/1994 | Card et al. | |
| 5,332,037 A | 7/1994 | Schmidt et al. | |
| 5,335,726 A | 8/1994 | Rodrigues | |
| 5,351,754 A | 10/1994 | Hardin et al. | |
| 5,358,051 A | 10/1994 | Rodrigues | |
| 5,360,068 A | 11/1994 | Sprunt et al. | |
| 5,361,856 A | 11/1994 | Surjaatmadja et al. | |
| 5,377,756 A | 1/1995 | Northrop et al. | |
| 5,377,759 A | 1/1995 | Surles | |
| 5,381,864 A | 1/1995 | Nguyen et al. | |
| 5,388,648 A | 2/1995 | Jordan, Jr. | |
| 5,390,741 A | 2/1995 | Payton et al. | |
| 5,393,810 A | 2/1995 | Harris et al. | |

| | | | | | | |
|---|---|---|---|---|---|---|
| 5,396,957 A | 3/1995 | Surjaatmadja et al. | | 5,924,488 A | 7/1999 | Nguyen et al. |
| 5,402,846 A | 4/1995 | Jennings, Jr. et al. | | 5,929,437 A | 7/1999 | Elliott et al. |
| 5,403,822 A | 4/1995 | Mueller et al. | | 5,944,105 A | 8/1999 | Nguyen |
| 5,420,174 A | 5/1995 | Dewprashad | | 5,944,106 A | 8/1999 | Dalrymple et al. |
| 5,422,183 A | 6/1995 | Sinclair et al. | | 5,945,387 A | 8/1999 | Chatterji et al. |
| 5,423,381 A | 6/1995 | Surles et al. | | 5,948,734 A | 9/1999 | Sinclair et al. |
| 5,464,060 A | 11/1995 | Hale et al. | | 5,957,204 A | 9/1999 | Chatterji et al. |
| 5,492,177 A | 2/1996 | Yeh et al. | | 5,960,784 A | 10/1999 | Ryan |
| 5,492,178 A | 2/1996 | Nguyen et al. | | 5,960,877 A | 10/1999 | Funkhouser et al. |
| 5,494,103 A | 2/1996 | Surjaatmadja et al. | | 5,960,878 A | 10/1999 | Nguyen et al. |
| 5,494,178 A | 2/1996 | Maharg | | 5,960,880 A | 10/1999 | Nguyen et al. |
| 5,498,280 A | 3/1996 | Fistner et al. | | 5,964,291 A | 10/1999 | Bourne et al. |
| 5,499,678 A | 3/1996 | Surjaatmadja et al. | | 5,969,006 A | 10/1999 | Onan et al. |
| 5,501,275 A | 3/1996 | Card et al. | | 5,969,823 A | 10/1999 | Wurz et al. |
| 5,512,071 A | 4/1996 | Yam et al. | | 5,977,283 A | 11/1999 | Rossitto |
| 5,520,250 A | 5/1996 | Harry et al. | | 5,992,522 A * | 11/1999 | Boyd et al. ................. 166/292 |
| 5,522,460 A | 6/1996 | Shu | | 5,994,785 A | 11/1999 | Higuchi et al. |
| 5,529,123 A | 6/1996 | Carpenter et al. | | RE36,466 E | 12/1999 | Nelson et al. |
| 5,531,274 A | 7/1996 | Bienvenu, Jr. | | 6,003,600 A | 12/1999 | Nguyen et al. |
| 5,545,824 A | 8/1996 | Stengel et al. | | 6,004,400 A | 12/1999 | Bishop et al. |
| 5,547,023 A | 8/1996 | McDaniel et al. | | 6,006,835 A | 12/1999 | Onan et al. |
| 5,551,513 A | 9/1996 | Surles et al. | | 6,006,836 A | 12/1999 | Chatterji et al. |
| 5,551,514 A | 9/1996 | Nelson et al. | | 6,012,524 A | 1/2000 | Chatterji et al. |
| 5,559,086 A | 9/1996 | Dewprashad et al. | | 6,016,870 A | 1/2000 | Dewprashad et al. |
| 5,582,249 A | 12/1996 | Caveny et al. | | 6,024,170 A | 2/2000 | McCabe et al. |
| 5,582,250 A | 12/1996 | Constien | | 6,028,113 A | 2/2000 | Scepanski |
| 5,588,488 A | 12/1996 | Vijn et al. | | 6,028,534 A | 2/2000 | Ciglenec et al. |
| 5,595,245 A | 1/1997 | Scott, III | | 6,040,398 A | 3/2000 | Kinsho et al. |
| 5,597,784 A | 1/1997 | Sinclair et al. | | 6,047,772 A | 4/2000 | Weaver et al. |
| 5,604,184 A | 2/1997 | Ellis et al. | | 6,059,034 A | 5/2000 | Rickards et al. |
| 5,620,049 A | 4/1997 | Gipson et al. | | 6,059,035 A | 5/2000 | Chatterji et al. |
| 5,639,806 A | 6/1997 | Johnson et al. | | 6,059,036 A | 5/2000 | Chatterji et al. |
| 5,663,123 A | 9/1997 | Goodhue, Jr. et al. | | 6,063,738 A | 5/2000 | Chatterji et al. |
| 5,692,566 A | 12/1997 | Surles | | 6,068,055 A | 5/2000 | Chatterji et al. |
| 5,697,440 A | 12/1997 | Weaver et al. | | 6,069,117 A | 5/2000 | Onan et al. |
| 5,697,448 A | 12/1997 | Johnson | | 6,070,667 A | 6/2000 | Gano |
| 5,701,956 A | 12/1997 | Hardy et al. | | 6,074,739 A | 6/2000 | Katagiri |
| 5,712,314 A | 1/1998 | Surles et al. | | 6,079,492 A | 6/2000 | Hoogteijling et al. |
| 5,732,364 A | 3/1998 | Kalb et al. | | 6,098,711 A | 8/2000 | Chatterji et al. |
| 5,738,136 A | 4/1998 | Rosenberg | | 6,114,410 A | 9/2000 | Betzold |
| 5,765,642 A | 6/1998 | Surjaatmadja | | 6,123,871 A | 9/2000 | Carroll |
| 5,775,425 A | 7/1998 | Weaver et al. | | 6,124,246 A | 9/2000 | Heathman et al. |
| 5,782,300 A | 7/1998 | James et al. | | 6,130,286 A | 10/2000 | Thomas et al. |
| 5,783,822 A | 7/1998 | Buchanan et al. | | 6,131,661 A | 10/2000 | Conner et al. |
| 5,787,986 A | 8/1998 | Weaver et al. | | 6,140,446 A | 10/2000 | Fujiki et al. |
| 5,791,415 A | 8/1998 | Nguyen et al. | | 6,143,698 A | 11/2000 | Murphey et al. |
| 5,799,734 A | 9/1998 | Norman et al. | | 6,148,911 A | 11/2000 | Gipson et al. |
| 5,806,593 A | 9/1998 | Surles | | 6,152,234 A | 11/2000 | Newhouse et al. |
| 5,830,987 A | 11/1998 | Smith | | 6,162,766 A | 12/2000 | Muir et al. |
| 5,833,000 A | 11/1998 | Weaver et al. | | 6,165,947 A | 12/2000 | Chang et al. |
| 5,833,361 A | 11/1998 | Funk | | 6,169,058 B1 | 1/2001 | Le et al. |
| 5,836,391 A | 11/1998 | Jonasson et al. | | 6,172,011 B1 | 1/2001 | Card et al. |
| 5,836,392 A | 11/1998 | Urlwin-Smith | | 6,172,077 B1 | 1/2001 | Curtis et al. |
| 5,836,393 A | 11/1998 | Johnson | | 6,176,315 B1 | 1/2001 | Reddy et al. |
| 5,837,656 A | 11/1998 | Sinclair et al. | | 6,177,484 B1 | 1/2001 | Surles |
| 5,837,785 A | 11/1998 | Kinsho et al. | | 6,184,311 B1 | 2/2001 | O'Keeffe et al. |
| 5,839,510 A | 11/1998 | Weaver et al. | | 6,186,228 B1 | 2/2001 | Wegener et al. |
| 5,840,784 A | 11/1998 | Funkhouser et al. | | 6,187,834 B1 | 2/2001 | Thayer et al. |
| 5,849,590 A | 12/1998 | Anderson, II et al. | | 6,187,839 B1 | 2/2001 | Eoff et al. |
| 5,853,048 A | 12/1998 | Weaver et al. | | 6,189,615 B1 | 2/2001 | Sydansk |
| 5,864,003 A | 1/1999 | Qureshi et al. | | 6,192,985 B1 | 2/2001 | Hinkel et al. |
| 5,865,936 A | 2/1999 | Edelman et al. | | 6,192,986 B1 | 2/2001 | Urlwin-Smith |
| 5,871,049 A | 2/1999 | Weaver et al. | | 6,196,317 B1 | 3/2001 | Hardy |
| 5,873,413 A | 2/1999 | Chatterji et al. | | 6,202,751 B1 | 3/2001 | Chatterji et al. |
| 5,875,844 A | 3/1999 | Chatterji et al. | | 6,209,643 B1 | 4/2001 | Nguyen et al. |
| 5,875,845 A | 3/1999 | Chatterji et al. | | 6,209,644 B1 | 4/2001 | Brunet |
| 5,875,846 A | 3/1999 | Chatterji et al. | | 6,209,646 B1 | 4/2001 | Reddy et al. |
| 5,893,383 A | 4/1999 | Facteau | | 6,210,471 B1 | 4/2001 | Craig |
| 5,893,416 A | 4/1999 | Read | | 6,214,773 B1 | 4/2001 | Harris et al. |
| 5,901,789 A | 5/1999 | Donnelly et al. | | 6,231,664 B1 | 5/2001 | Chatterji et al. |
| 5,911,282 A | 6/1999 | Onan et al. | | 6,234,251 B1 | 5/2001 | Chatterji et al. |
| 5,916,933 A | 6/1999 | Johnson et al. | | 6,238,597 B1 | 5/2001 | Yim et al. |
| 5,921,317 A | 7/1999 | Dewprashad et al. | | 6,241,019 B1 | 6/2001 | Davidson et al. |

| | | |
|---|---|---|
| 6,242,390 B1 | 6/2001 | Mitchell et al. |
| 6,244,344 B1 | 6/2001 | Chatterji et al. |
| 6,257,335 B1 | 7/2001 | Nguyen et al. |
| 6,260,622 B1 | 7/2001 | Blok et al. |
| 6,271,181 B1 | 8/2001 | Chatterji et al. |
| 6,274,650 B1 | 8/2001 | Cui |
| 6,279,652 B1 | 8/2001 | Chatterji et al. |
| 6,279,656 B1 | 8/2001 | Sinclair et al. |
| 6,283,214 B1 | 9/2001 | Guinot et al. |
| 6,302,207 B1 | 10/2001 | Nguyen et al. |
| 6,306,998 B1 | 10/2001 | Kimura et al. |
| 6,308,777 B2 | 10/2001 | Chatterji et al. |
| 6,310,008 B1 | 10/2001 | Rietjens |
| 6,311,773 B1 | 11/2001 | Todd et al. |
| 6,315,040 B1 | 11/2001 | Donnelly |
| 6,321,841 B1 | 11/2001 | Eoff et al. |
| 6,328,105 B1 | 12/2001 | Betzold |
| 6,328,106 B1 | 12/2001 | Griffith et al. |
| 6,330,916 B1 | 12/2001 | Rickards et al. |
| 6,330,917 B2 | 12/2001 | Chatterji et al. |
| 6,342,467 B1 | 1/2002 | Chang et al. |
| 6,350,309 B2 | 2/2002 | Chatterji et al. |
| 6,357,527 B1 | 3/2002 | Norman et al. |
| 6,364,018 B1 | 4/2002 | Brannon et al. |
| 6,364,945 B1 | 4/2002 | Chatterji et al. |
| 6,367,165 B1 | 4/2002 | Huttlin |
| 6,367,549 B1 | 4/2002 | Chatterji et al. |
| 6,372,678 B1 | 4/2002 | Youngman et al. |
| 6,376,571 B1 | 4/2002 | Chawla et al. |
| 6,394,181 B2 | 5/2002 | Schnatzmeyer et al. |
| 6,401,817 B1 | 6/2002 | Griffith et al. |
| 6,405,796 B1 | 6/2002 | Meyer et al. |
| 6,405,797 B2 | 6/2002 | Davidson et al. |
| 6,406,789 B1 | 6/2002 | McDaniel et al. |
| 6,408,943 B1 | 6/2002 | Schultz et al. |
| 6,415,509 B1 | 7/2002 | Echols et al. |
| 6,422,183 B1 | 7/2002 | Kato |
| 6,422,314 B1 | 7/2002 | Todd et al. |
| 6,439,309 B1 | 8/2002 | Matherly et al. |
| 6,439,310 B1 | 8/2002 | Scott, III et al. |
| 6,440,255 B1 | 8/2002 | Kohlhammer et al. |
| 6,448,206 B1 | 9/2002 | Griffith et al. |
| 6,450,260 B1 | 9/2002 | James et al. |
| 6,457,518 B1 | 10/2002 | Castano-Mears et al. |
| 6,458,885 B1 | 10/2002 | Stengel et al. |
| 6,478,092 B2 | 11/2002 | Voll et al. |
| 6,488,091 B1 | 12/2002 | Weaver et al. |
| 6,488,763 B2 | 12/2002 | Brothers et al. |
| 6,494,263 B2 | 12/2002 | Todd |
| 6,503,870 B2 | 1/2003 | Griffith et al. |
| 6,508,306 B1 | 1/2003 | Reddy et al. |
| 6,510,896 B2 | 1/2003 | Bode et al. |
| 6,520,255 B2 | 2/2003 | Tolman et al. |
| 6,528,157 B1 | 3/2003 | Hussain et al. |
| 6,531,427 B1 | 3/2003 | Shuchart et al. |
| 6,534,449 B1 | 3/2003 | Gilmour et al. |
| 6,536,939 B1 | 3/2003 | Blue |
| 6,538,576 B1 | 3/2003 | Schultz et al. |
| 6,543,545 B1 | 4/2003 | Chatterji et al. |
| 6,550,959 B2 | 4/2003 | Huber et al. |
| 6,552,333 B1 | 4/2003 | Storm et al. |
| 6,555,507 B2 | 4/2003 | Chatterji et al. |
| 6,582,819 B2 | 6/2003 | McDaniel et al. |
| 6,588,926 B2 | 7/2003 | Huber et al. |
| 6,588,928 B2 | 7/2003 | Huber et al. |
| 6,593,402 B2 | 7/2003 | Chatterji et al. |
| 6,599,863 B1 | 7/2003 | Palmer et al. |
| 6,608,162 B1 | 8/2003 | Chiu et al. |
| 6,609,578 B2 | 8/2003 | Patel et al. |
| 6,616,320 B2 | 9/2003 | Huber et al. |
| 6,620,857 B2 | 9/2003 | Valet |
| 6,632,778 B1 | 10/2003 | Ayoub et al. |
| 6,632,892 B2 | 10/2003 | Rubinsztajn et al. |
| 6,642,309 B2 | 11/2003 | Komitsu et al. |
| 6,648,501 B2 | 11/2003 | Huber et al. |
| 6,659,179 B2 | 12/2003 | Nguyen |
| 6,664,343 B2 | 12/2003 | Narisawa et al. |
| 6,668,926 B2 | 12/2003 | Nguyen et al. |
| 6,669,771 B2 | 12/2003 | Tokiwa et al. |
| 6,677,426 B2 | 1/2004 | Noro et al. |
| 6,702,044 B2 | 3/2004 | Reddy et al. |
| 6,705,400 B1 | 3/2004 | Nguyen et al. |
| 6,713,170 B1 | 3/2004 | Kaneko et al. |
| 6,725,926 B2 | 4/2004 | Nguyen et al. |
| 6,725,930 B2 | 4/2004 | Boney et al. |
| 6,725,931 B2 | 4/2004 | Nguyen et al. |
| 6,729,404 B2 | 5/2004 | Nguyen et al. |
| 6,729,405 B2 | 5/2004 | DiLullo et al. |
| 6,732,800 B2 | 5/2004 | Acock et al. |
| 6,745,159 B1 | 6/2004 | Todd et al. |
| 6,749,025 B1 | 6/2004 | Brannon et al. |
| 6,766,858 B2 | 7/2004 | Nguyen et al. |
| 6,776,235 B1 | 8/2004 | England |
| 6,776,236 B1 | 8/2004 | Nguyen |
| 6,823,940 B2 | 11/2004 | Reddy et al. |
| 6,832,650 B2 | 12/2004 | Nguyen et al. |
| 6,832,655 B2 | 12/2004 | Ravensbergen et al. |
| 6,837,309 B2 | 1/2005 | Boney et al. |
| 6,837,316 B2 | 1/2005 | Reddy et al. |
| 6,848,519 B2 | 2/2005 | Reddy et al. |
| 6,851,474 B2 | 2/2005 | Nguyen |
| 6,866,099 B2 | 3/2005 | Nguyen |
| 6,881,708 B2 | 4/2005 | Reddy et al. |
| 6,881,709 B2 | 4/2005 | Nelson et al. |
| 6,887,834 B2 | 5/2005 | Nguyen et al. |
| 6,957,702 B2 | 10/2005 | Brothers et al. |
| 6,962,200 B2 | 11/2005 | Nguyen et al. |
| 6,962,201 B2 | 11/2005 | Brothers et al. |
| 6,978,836 B2 | 12/2005 | Nguyen et al. |
| 6,997,259 B2 | 2/2006 | Nguyen |
| 7,013,976 B2 | 3/2006 | Nguyen et al. |
| 7,017,665 B2 | 3/2006 | Nguyen |
| 7,025,134 B2 | 4/2006 | Byrd et al. |
| 7,028,774 B2 | 4/2006 | Nguyen et al. |
| 7,032,667 B2 | 4/2006 | Nguyen et al. |
| 7,036,589 B2 | 5/2006 | Nguyen |
| 7,040,403 B2 | 5/2006 | Nguyen et al. |
| 7,059,406 B2 | 6/2006 | Nguyen |
| 7,063,150 B2 | 6/2006 | Slabaugh et al. |
| 7,066,258 B2 | 6/2006 | Justus et al. |
| 7,073,581 B2 | 7/2006 | Nguyen et al. |
| 7,080,688 B2 | 7/2006 | Todd et al. |
| 7,081,439 B2 | 7/2006 | Sullivan et al. |
| 7,082,998 B2 | 8/2006 | Zamora et al. |
| 7,093,658 B2 | 8/2006 | Chatterji et al. |
| 7,104,325 B2 | 9/2006 | Nguyen et al. |
| 7,114,560 B2 | 10/2006 | Nguyen et al. |
| 7,114,570 B2 | 10/2006 | Nguyen et al. |
| 7,117,942 B2 | 10/2006 | Dalrymple et al. |
| 7,131,491 B2 | 11/2006 | Blauch et al. |
| 7,153,575 B2 | 12/2006 | Anderson et al. |
| 7,156,194 B2 | 1/2007 | Nguyen |
| 7,174,961 B2 | 2/2007 | Chatterji et al. |
| 7,178,596 B2 | 2/2007 | Blauch et al. |
| 7,204,311 B2 | 4/2007 | Welton et al. |
| 7,210,528 B1 | 5/2007 | Brannon et al. |
| 7,213,645 B2 * | 5/2007 | Sweatman et al. .......... 166/281 |
| 7,216,711 B2 | 5/2007 | Nguyen et al. |
| 7,252,146 B2 | 8/2007 | Slabaugh et al. |
| 7,261,156 B2 | 8/2007 | Nguyen et al. |
| 7,264,051 B2 | 9/2007 | Nguyen et al. |
| 7,264,052 B2 | 9/2007 | Nguyen et al. |
| 7,267,717 B2 | 9/2007 | Watanabe et al. |
| 7,273,099 B2 | 9/2007 | East, Jr. et al. |
| 7,281,581 B2 | 10/2007 | Nguyen et al. |
| 7,282,093 B2 | 10/2007 | Brothers et al. |

| | | | | | |
|---|---|---|---|---|---|
| 7,306,037 B2 | 12/2007 | Nguyen et al. | 2005/0034862 A1 | 2/2005 | Nguyen |
| 7,343,973 B2 | 3/2008 | Dusterhoft et al. | 2005/0034865 A1 | 2/2005 | Todd et al. |
| 7,351,279 B2 | 4/2008 | Brothers | 2005/0045326 A1 | 3/2005 | Nguyen |
| 7,407,010 B2 | 8/2008 | Rickman et al. | 2005/0045330 A1 | 3/2005 | Nguyen et al. |
| 7,424,914 B2 | 9/2008 | Reddy et al. | 2005/0045384 A1 | 3/2005 | Nguyen |
| 7,441,598 B2 | 10/2008 | Nguyen | 2005/0051331 A1 | 3/2005 | Nguyen et al. |
| 7,441,600 B2 | 10/2008 | Brothers | 2005/0051332 A1 | 3/2005 | Nguyen et al. |
| 7,488,705 B2 | 2/2009 | Reddy et al. | 2005/0059555 A1 | 3/2005 | Dusterhoft et al. |
| 7,493,968 B2 | 2/2009 | Reddy et al. | 2005/0061509 A1 | 3/2005 | Nguyen |
| 7,500,521 B2 | 3/2009 | Nguyen et al. | 2005/0092489 A1 | 5/2005 | Welton et al. |
| 2001/0016562 A1 | 8/2001 | Muir et al. | 2005/0126780 A1 | 6/2005 | Todd et al. |
| 2002/0036088 A1 | 3/2002 | Todd | 2005/0139359 A1 | 6/2005 | Maurer et al. |
| 2002/0043370 A1 | 4/2002 | Poe | 2005/0145385 A1 | 7/2005 | Nguyen |
| 2002/0048676 A1 | 4/2002 | McDaniel et al. | 2005/0173116 A1 | 8/2005 | Nguyen et al. |
| 2002/0070020 A1 | 6/2002 | Nguyen | 2005/0178551 A1 | 8/2005 | Tolman et al. |
| 2002/0104217 A1 | 8/2002 | Echols et al. | 2005/0194135 A1 | 9/2005 | Nguyen et al. |
| 2002/0160920 A1 | 10/2002 | Dawson et al. | 2005/0194136 A1 | 9/2005 | Nguyen et al. |
| 2002/0169085 A1 | 11/2002 | Miller et al. | 2005/0194140 A1 | 9/2005 | Dalrymple et al. |
| 2002/0189808 A1 | 12/2002 | Nguyen et al. | 2005/0194142 A1 | 9/2005 | Nguyen |
| 2003/0006036 A1 | 1/2003 | Malone et al. | 2005/0197258 A1 | 9/2005 | Nguyen |
| 2003/0013871 A1 | 1/2003 | Mallon et al. | 2005/0207001 A1 | 9/2005 | Laufer et al. |
| 2003/0060374 A1 | 3/2003 | Cooke, Jr. | 2005/0257929 A1 | 11/2005 | Nguyen et al. |
| 2003/0106690 A1 | 6/2003 | Boney et al. | 2005/0263283 A1 | 12/2005 | Nguyen |
| 2003/0114314 A1 | 6/2003 | Ballard et al. | 2005/0267001 A1 | 12/2005 | Weaver et al. |
| 2003/0114317 A1 | 6/2003 | Benton et al. | 2005/0269086 A1 | 12/2005 | Nguyen et al. |
| 2003/0130133 A1 | 7/2003 | Vollmer | 2005/0269101 A1 | 12/2005 | Stegent et al. |
| 2003/0131999 A1 | 7/2003 | Nguyen et al. | 2005/0274510 A1 | 12/2005 | Nguyen et al. |
| 2003/0148893 A1 | 8/2003 | Lunghofer et al. | 2005/0274517 A1 | 12/2005 | Blauch et al. |
| 2003/0186820 A1 | 10/2003 | Thesing | 2005/0274520 A1 | 12/2005 | Nguyen et al. |
| 2003/0188766 A1 | 10/2003 | Banerjee et al. | 2005/0277554 A1 | 12/2005 | Blauch et al. |
| 2003/0188872 A1 | 10/2003 | Nguyen et al. | 2005/0284632 A1 | 12/2005 | Dalrymple et al. |
| 2003/0196805 A1 | 10/2003 | Boney et al. | 2005/0284637 A1 | 12/2005 | Stegent et al. |
| 2003/0205376 A1 | 11/2003 | Ayoub et al. | 2006/0048943 A1 | 3/2006 | Parker et al. |
| 2003/0230408 A1 | 12/2003 | Acock et al. | 2006/0048944 A1 | 3/2006 | van Batenburg et al. |
| 2003/0230431 A1 | 12/2003 | Reddy et al. | 2006/0052251 A1 | 3/2006 | Anderson et al. |
| 2003/0234103 A1 | 12/2003 | Lee et al. | 2006/0089266 A1 | 4/2006 | Dusterhoft et al. |
| 2004/0000402 A1 | 1/2004 | Nguyen et al. | 2006/0113078 A1 | 6/2006 | Nguyen et al. |
| 2004/0014607 A1 | 1/2004 | Sinclair et al. | 2006/0124303 A1 | 6/2006 | Nguyen et al. |
| 2004/0014608 A1 | 1/2004 | Nguyen et al. | 2006/0124309 A1 | 6/2006 | Nguyen et al. |
| 2004/0040706 A1 | 3/2004 | Hossaini et al. | 2006/0137875 A1 | 6/2006 | Dusterhoft et al. |
| 2004/0040708 A1 | 3/2004 | Stephenson et al. | 2006/0157243 A1 | 7/2006 | Nguyen |
| 2004/0040712 A1 | 3/2004 | Ravi et al. | 2006/0175058 A1 | 8/2006 | Nguyen |
| 2004/0040713 A1 | 3/2004 | Nguyen et al. | 2006/0219405 A1 | 10/2006 | Nguyen et al. |
| 2004/0043906 A1 | 3/2004 | Heath et al. | 2006/0219408 A1 | 10/2006 | Nguyen et al. |
| 2004/0045712 A1 | 3/2004 | Eoff et al. | 2006/0234874 A1 | 10/2006 | Eoff et al. |
| 2004/0048752 A1 | 3/2004 | Nguyen et al. | 2006/0240994 A1 | 10/2006 | Eoff et al. |
| 2004/0055747 A1 | 3/2004 | Lee | 2006/0240995 A1 | 10/2006 | Rickman et al. |
| 2004/0060702 A1 | 4/2004 | Kotlar et al. | 2006/0260810 A1 | 11/2006 | Weaver et al. |
| 2004/0106525 A1 | 6/2004 | Willberg et al. | 2006/0260813 A1 | 11/2006 | Welton et al. |
| 2004/0138068 A1 | 7/2004 | Rimmer et al. | 2006/0264332 A1 | 11/2006 | Welton et al. |
| 2004/0149441 A1 | 8/2004 | Nguyen et al. | 2006/0266522 A1 | 11/2006 | Eoff et al. |
| 2004/0152602 A1 | 8/2004 | Boles | 2006/0283592 A1 | 12/2006 | Sierra et al. |
| 2004/0177961 A1 | 9/2004 | Nguyen et al. | 2006/0289160 A1 | 12/2006 | van Batenburg et al. |
| 2004/0194961 A1 | 10/2004 | Nguyen et al. | 2007/0007010 A1 | 1/2007 | Welton et al. |
| 2004/0206499 A1 | 10/2004 | Nguyen et al. | 2007/0012445 A1 | 1/2007 | Nguyen et al. |
| 2004/0211559 A1 | 10/2004 | Nguyen et al. | 2007/0029087 A1 | 2/2007 | Nguyen et al. |
| 2004/0211561 A1 | 10/2004 | Nguyen et al. | 2007/0114032 A1 | 5/2007 | Stegent et al. |
| 2004/0221992 A1 | 11/2004 | Nguyen et al. | 2007/0131422 A1 | 6/2007 | Gatlin et al. |
| 2004/0231845 A1 | 11/2004 | Cooke, Jr. | 2007/0131425 A1 | 6/2007 | Gatlin et al. |
| 2004/0231847 A1 | 11/2004 | Nguyen et al. | 2007/0137528 A1 | 6/2007 | Le Roy-Delage et al. |
| 2004/0256097 A1 | 12/2004 | Byrd et al. | 2007/0169937 A1* | 7/2007 | Allin et al. ................. 166/295 |
| 2004/0256099 A1 | 12/2004 | Nguyen et al. | 2007/0204765 A1 | 9/2007 | Le Roy-Delage et al. |
| 2004/0261993 A1 | 12/2004 | Nguyen | 2007/0267194 A1 | 11/2007 | Nguyen et al. |
| 2004/0261995 A1 | 12/2004 | Nguyen et al. | 2008/0006406 A1 | 1/2008 | Nguyen et al. |
| 2004/0261997 A1 | 12/2004 | Nguyen et al. | 2008/0099203 A1 | 5/2008 | Mueller et al. |
| 2004/0261999 A1 | 12/2004 | Nguyen | 2008/0110624 A1 | 5/2008 | Nguyen et al. |
| 2005/0000694 A1 | 1/2005 | Dalrymple et al. | 2008/0135251 A1 | 6/2008 | Nguyen et al. |
| 2005/0000731 A1 | 1/2005 | Nguyen et al. | 2008/0264637 A1 | 10/2008 | Burts et al. |
| 2005/0006093 A1 | 1/2005 | Nguyen et al. | 2008/0264638 A1 | 10/2008 | Burts et al. |
| 2005/0006095 A1 | 1/2005 | Justus et al. | 2008/0277117 A1 | 11/2008 | Burts, Jr. et al. |
| 2005/0006096 A1 | 1/2005 | Nguyen et al. | 2008/0289824 A1 | 11/2008 | Burts, Jr. et al. |
| 2005/0028976 A1 | 2/2005 | Nguyen | 2009/0071650 A1 | 3/2009 | Roddy et al. |
| 2005/0028979 A1 | 2/2005 | Brannon et al. | | | |

2009/0088348 A1   4/2009   Roddy et al.

FOREIGN PATENT DOCUMENTS

| | | |
|---|---|---|
| EP | 0313243 | 4/1989 |
| EP | 0506934 | 10/1992 |
| EP | 0528595 | 2/1993 |
| EP | 0643196 | 3/1995 |
| EP | 0834644 | 4/1998 |
| EP | 0853186 | 7/1998 |
| EP | 0864726 | 9/1998 |
| EP | 0933498 | 8/1999 |
| EP | 1001133 | 5/2000 |
| EP | 1 028 096 A2 | 8/2000 |
| EP | 1132569 | 9/2001 |
| EP | 1326003 | 7/2003 |
| EP | 1362978 | 11/2003 |
| EP | 1394355 | 3/2004 |
| EP | 1396606 | 3/2004 |
| EP | 1398460 | 3/2004 |
| EP | 1403466 | 3/2004 |
| EP | 1464789 | 10/2004 |
| EP | 1607572 | 12/2005 |
| GB | 1107584 | 3/1968 |
| GB | 1264180 | 2/1972 |
| GB | 1292718 | 10/1972 |
| GB | 2298440 | 9/1996 |
| GB | 2382143 | 5/2003 |
| WO | WO0181914 | 11/2001 |
| WO | WO2004/009956 | 1/2004 |
| WO | WO 2004/009956 | 1/2004 |
| WO | WO 2004/083600 | 9/2004 |
| WO | WO2004090281 | 10/2004 |
| WO | WO2004104368 | 12/2004 |
| WO | WO 2005/021928 | 3/2005 |
| WO | WO2005080749 | 9/2005 |
| WO | WO2006103385 | 10/2006 |
| WO | WO2006116868 | 11/2006 |
| WO | WO2007091007 | 8/2007 |
| WO | WO 2008/147659 A1 | 12/2008 |

OTHER PUBLICATIONS

CDX Gas, "What is Coalbed Methane?" CDX, LLC. Available @ www.cdxgas.com/what.html, printed p. 1, undated.

Dusseault et ai, "Pressure Pulse Workovers in Heavy Oil", SPE 79033.

Feisenthal et al., Pressure Pulsing—An Improved Method of Waterflooding Fractured Reservoirs SPE 1788, 1957.

Foreign communication from a related counterpart application, Sep. 16, 2004.

Foreign communication related to a counterpart application dated Jul. 31, 2006.

Foreign Search Report and Written Opinion for PCT/GB2006/000366, Feb. 2, 2006.

Gorman, Plastic Electric: Lining up the Future of Conducting Polymers Science News, vol. 163, May 17, 2003.

Halliburton brochure entitled "H2Zero Service: Introducing The Next Generation of cost-Effective Conformance Control Solutions" 2002.

Halliburton brochure entitled "SurgiFrac Service, a Quick and cost-Effective Method to Help Boost Production From Openhole Horizontal Completions", 2002.

Halliburton brochure entitled "Sanfix A Resin", 1999.

Halliburton brochure entitled INJECTROL A Component, 1999.

Halliburton brochure entitled "INJECTROL U Sealant", 1999.

Halliburton brochure entitled "INJECTROL G Sealant" 1999.

Halliburton brochure entitled "INJECTROL IT Sealant" 1999.

Halliburton brochure entitled "INJECTROL Service Treatment" 1999.

Halliburton Cobra Frac Advertisement, 2001.

Halliburton brochure entitled "CoalStim Service, Helps Boost Cash Flow From CBM Assets", 2003.

Halliburton brochure entitled "Conductivity Endurance Technology for High Permeability Reservoirs, Helps Prevent Intrusion of Formation Material Into the Proppant Pack for Improved Long-term Production", 2003.

Halliburton brochure entitled "Expedite Service, A Step-Change Improvement Over Conventional Proppant Flowback Control Systems. Provides Up to Three Times the Conductivity of RCPs" May 2004.

Halliburton brochure entitled SandWedge NT Conductivity Enhancement System, Enhances Proppant Pack Conductivity and Helps Prevent Intrusion of Formation Material for Improved Long-Term Production, Stimulation, HO2289 May 2004, Halliburton Communications.

Raza, "Water and Gas Cyclic Pulsing Method for Improved Oil Recovery", SPE 3005, 1971.

S W. Almond et al., "Factors Affecting Proppant Flowback With Resin Coated Proppants," SPE 30096 (1995 European Formation Damage Conference, May 15-16, 1995).

SPE 15547, Field Application of Lignosulfonate Gels to Reduce Channeling, South Swan Hills Miscible Unit, Alberta, Canada, by O. R. Wagner et al., 1986.

Spe 90398, Maximizing Effective Proppant Permeability under High-Stress, High Gas-Rate Conditions. Dusterhoft, R., Nguyen, P., Conway, M., Sep. 2004.

Halliburton, Expedite® Service, "A Step-Change Improvement Over Conventional Proppant Flowback Control Systems. Provides Up to Three Times the Conductivity of RCPs," Stimulation, HO3296 Jun. 2008.

Halliburton, Hi-Dense, "Weight Additives," HO1334, 1998.

Baroid Fluid Services Product Data Sheet, "Lubra-Beads®," Halliburton Fluid Systems, Sep. 5, 2006.

Halliburton, Microsand, "Cement Additive," HO1460, 1999.

Halliburton, Cementing, Spherelite™, "Cement Additive," HO1516, Aug. 2007.

Eoff, et al., "Water-Dispersible Resin System for Wellbore Stabilization," SPE 64980, 2001, Society of Petroleum Engineers, Inc.

Nguyen, et al., "Stabilizing Wellbores in Unconsolidated, Clay-Laden Formations," SPE Production & Operations, Aug. 2006.

Cole, Robert C., "Epoxy Sealant for Combating Well Corrosion," SPE 7874, American Institute of Mining, Metallurgical, and Petroleum Engineers, Inc., 1979.

Halliburton, Epseal® C-1, Accelerator, HO2623, 2007.

Halliburton, Epseal® C-4, Hardener, HO2023, 2007.

Halliburton, Epseal® LC, Catalyst, HO2624, 2007.

Halliburton, Epseal® RE, Sealant, HO2081, 2007.

Simpson et al., An Integrated Approach to Solving Water-Confirmance Problems, SPE 53667, 1999.

Eoff et al., Water-Dispersible Resin System for Wellbore Stabilization, SPE 64980, 2001.

Pei et al., Plugging Channels Technique Without Abandoned Adjacent Layers, SPE/PS-CIM/CHOA 97817, PS2006-376, Petroleum Society, 2005.

White et al., A Laboratory Study of Cement and Resin Plugs Placed with Thru-Tubing Dump Bailers, Society of Petroleum Engineers, 1992.

Halliburton Services, Epseal Sealants, Marketing Publication WCS-0245, Undated.

"Santrol Bioballs"; http://www.fairmounminerals.com/.sub.—SANTROL/SANTROL%20Web%20Site/B.sub-.—TD.htm., Sep. 30, 2004.

CDX Gas, CDX Solution, 2003, CDX, LLC, Available @ www.cdxgas.com/solution.html, printed pp. 1-2., Last visited Feb. 16, 2005.

Foreign Search Report and Written Opinion PCT/GB2005/004009, Jan. 11, 2006.

Foreign Search Report for EP 03254267, Mar. 11, 2005.

Foreign Search Report and Opinion (PCT Appln. No. GB2004/001497), Jul. 20, 2004.

Foreign Search Report and Opinion (PCT Appln. No. GB2004/001842), Dec. 10, 2004.

Foreign Search Report and Opinion (PCT Appln. No. GB2004/002674), Dec. 16, 2004.

Foreign Search Report and Opinion (PCT Appl. No. GB2004/002968), Nov. 16, 2004.
Foreign Search Report and Opinion (PCT Appl. No. GB2004/004242), Feb. 10, 2005.
Foreign search report and Opinion (PCT Appl. No. GB2004/000689), Jun. 4, 2004.
Foreign search report and opinion (PCT/GB2004/002727), Mar. 11, 2005.
Foreign Search Report and Opinion (PCT/GB2004/002747), Mar. 11, 2005.
Foreign search report and opinion PCT/GB2005/004010, Feb. 21, 2006.
Foreign search report and opinion PCT/GB2006/004102, Feb. 20, 2007.
Foreign search report and opinion PCT/GB2006/004137, Jan. 17, 2007.
Foreign search report and opinion PCT/GB2006/004852, Mar. 7, 2007.
Foreign search report and opinion PCT/GB2007/000467, Jun. 15, 2007.
Foreign search report PCT/GB2005/003747, Dec. 12, 2005.
Foreign search report PCT/GB2007/000421, May 10, 2007.
Gidley et al., "Recent Advances in Hydraulic Fracturing," Chapter 6, pp. 109-130, 1989.
Halliburton brochure entitled "CobraFrac Service, Coiled Tubing Fracturing—Cost-Effective Method for Stimulation Untapped Reserves," 2000.
Halliburton brochure entitled "CobraJetFrac Service, Cost-Effective Technology That Can Help Reduce Cost per BOE Produced, Shorten Cycle Time and Reduce Capex," Apr. 2003.
Halliburton brochure entitled "Pillar Frac Stimulation Technique" Fracturing Service Technical Data Sheet, 2001.
Halliburton Technical Flier—Multi Stage Frac Completion Methods, Undated.
International Search Report PCT/GB2007/002273, Sep. 3, 2007.
International Search Report PCT/GB2004/002948, May 24, 2005.
International Search Report PCT/GB2005/000637, Jun. 2, 2005.
International Search Report, PCT/GB2005/000634, Jun. 8, 2005.
Kazakov et al., "Optimizing and Managing Coiled Tubing Frac Strings" SPE 60747, 2000.
Nguyen et al., A Novel Approach for Enhancing Proppant Consolidation: Laboratory Testing And Field Applications, SPE 77748, 2002.
Nguyen et al., New Guidelines For Applying Curable Resin-Coated Proppants, SPE 39582, 1997.
Owens et al., "Waterflood Pressure Pulsing for Fractured Reservoirs" SPE 1123, 1966.
Peng et al., "Pressure Pulsing Waterflooding in Dual Porosity Naturally Fractured Reservoirs" SPE 17587, 1988.
SPE 17154 Paccaloni, 1988.
SPE 20623 Paccaloni, 1993.
SPE.82215, Controlling Proppant Flowback in High-Temperature, High-Production Wells, Nguyen et al., 2003.
Yang et al., "Experimental Study on Fracture Initiation By Pressure Pulse", SPE 63035, 2000.
Halliburton brochure entitled "CobraJet Frac® Service, Cost-Effective Technology that Can Help Reduce Cost per BOE Produced, Shorten Cycle Time and Reduce Capex", Aug. 2006.
International Search Report and Written Opinion for PCT/GB2010/000118 dated Apr. 22, 2010.

* cited by examiner

METHODS FOR SERVICING WELL BORES WITH HARDENABLE RESIN COMPOSITIONS

BACKGROUND

The present invention relates to methods and compositions for servicing well bores. More particularly, the present invention relates to methods for servicing well bores with hardenable resin compositions.

Natural resources such as gas, oil, and water residing in a subterranean formation or zone are usually recovered by drilling a well bore into the subterranean formation while circulating a drilling fluid in the well bore. After terminating the circulation of the drilling fluid, a string of pipe (e.g., casing) is run in the well bore. The drilling fluid is then usually circulated downward through the interior of the pipe and upward through the annulus, which is located between the exterior of the pipe and the walls of the well bore. Next, primary cementing is typically performed whereby a cement slurry is placed in the annulus and permitted to set into a hard mass (i.e., sheath) to thereby attach the string of pipe to the walls of the well bore and seal the annulus. Subsequent secondary or remedial cementing operations may also be performed, for example, to repair primary-cementing problems and/or treat conditions within the well bore after the well bore has been constructed.

A variety of well bore servicing compositions, including non-cementatious sealants, such as polymer-, resin-, or latex-based sealants, have been used in these secondary or remedial cementing operations. These compositions may be circulated through the well bore to plug a void or crack in the conduit or cement sheath or an opening between the two. Occasionally, well bores may be shut-in, for example, when the produced fluids cannot be handled or sold economically due to low hydrocarbon demand. During this time, conditions within the well bore may change, resulting in the formation of voids or cracks in the conduit or cement sheath or between the two. However, because the well bore is shut-in, it may not be possible to circulate a well bore servicing composition through the well bore to repair these conditions. Without the ability to circulate such a composition through the well bore, it may be difficult to adequately repair these voids or cracks, if at all.

SUMMARY

The present invention relates to methods and compositions for servicing well bores. More particularly, the present invention relates to methods for servicing well bores with hardenable resin compositions.

In one embodiment of the present invention, the invention provides a method of servicing a well bore comprising providing a hydrophobic well bore servicing composition comprising a liquid hardenable resin, a hardening agent, and a weighting material selected to impart a desired first density to the well bore servicing composition; introducing the well bore servicing composition into a well bore comprising a well bore fluid having a second density; allowing the well bore servicing composition to migrate through the well bore fluid to a desired location in the well bore based at least in part upon a difference between the first and second densities; and allowing the liquid hardenable resin to at least partially harden to form a well bore plug at the desired location in the well bore.

In another embodiment of the present invention, the invention provides a method of servicing a well bore comprising providing a hydrophobic well bore servicing composition comprising a liquid hardenable resin, a hardening agent, and a low-density weighting material; introducing the well bore servicing composition into a well bore below a desired location, the well bore comprising a well bore fluid; allowing the well bore servicing composition to migrate through the well bore fluid to the desired location in the well bore; and allowing the liquid hardenable resin to at least partially harden to form a well bore plug at the desired location in the well bore.

In yet another embodiment of the present invention, the invention provides a method of servicing a well bore comprising providing a hydrophobic well bore servicing composition comprising a liquid hardenable resin, a hardening agent, and a high-density weighting material; introducing the well bore servicing composition into a well bore above a desired location, the well bore comprising a well bore fluid; allowing the well bore servicing composition to migrate through the well bore fluid to the desired location in the well bore; and allowing the liquid hardenable resin to at least partially harden to form a well bore plug at the desired location in the well bore.

In still another embodiment of the present invention, the invention provides a method comprising providing a hydrophobic well bore servicing composition comprising a liquid hardenable resin, a hardening agent, and a weighting material; introducing the well bore servicing composition into an annulus between a pipe string and a subterranean formation; and allowing the well bore servicing composition to at least partially harden within the annulus.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to methods and compositions for servicing well bores. More particularly, the present invention relates to methods for servicing well bores with hardenable resin compositions.

In particular embodiments, the well bore servicing compositions of the present invention may be used in the primary cementing of a well bore, or to create a well bore plug in a well bore that has been shut-in. As used herein, a "well bore servicing composition" refers to a fluid used to drill, complete, work over, repair, or in any way prepare a well bore for the recovery of materials residing in a subterranean formation penetrated by the well bore. Examples of well bore servicing compositions include, but are not limited to cement slurries, lost circulation pills, settable fluids, servicing compositions for plug-and-abandon purposes, chemical packers, temporary plugs, spacer fluids, completion fluids, and remedial fluids.

Generally, the well bore servicing compositions of the present invention comprise a liquid hardenable resin component, a liquid hardening agent component, and a weighting material. In particular embodiments, the weighting material may be selected to have low density so that the servicing composition may be introduced into a well bore below a desired location and allowed to float up into place in the desired location. In other embodiments, the weighting material may be selected to have a high density so that the servicing composition may be introduced into a well bore above a desired location and allowed to sink into place in the desired location. Accordingly, in particular embodiments of the present invention, the servicing compositions may be used to service well bores that have been shut-in, where it is not possible to circulate a fluid through the well bore. In other embodiments, the well bore servicing composition may be used in primary cementing operations to cement a pipe string in place. Furthermore, in particular embodiments, the well bore servicing composition may be selected to be hydrophobic, so that the composition does not disperse in water and may be selectively placed within the well bore using the buoyancy of the weighting material to facilitate the placement of the composition in a desired location.

In particular embodiments of the present, the liquid hardenable resin component of the well bore servicing composition may comprise a hardenable resin, an optional solvent, and an optional aqueous diluent or carrier fluid. As used herein, the term "resin" refers to any of a number of physically similar polymerized synthetics or chemically modified natural resins including thermoplastic materials and thermosetting materials. Examples of hardenable resins that may be used in the liquid hardenable resin component include, but are not limited to, epoxy-based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, bisphenol A diglycidyl ether resins, butoxymethyl butyl glycidyl ether resins, bisphenol A-epichlorohydrin resins, bisphenol F resins, glycidyl ether resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped down hole, they may be cured using only time and temperature. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. It is within the ability of one skilled in the art, with the benefit of this disclosure, to select a suitable resin for use in embodiments of the present invention and to determine whether a catalyst is required to trigger curing. One resin that may be used in particular embodiments of the present invention is the consolidation agent commercially available from Halliburton Energy Services, Inc., of Duncan, Okla., under the trade name "EXPEDITET™."

Selection of a suitable resin may be affected by the temperature of the subterranean formation to which the fluid will be introduced. By way of example, for subterranean formations having a bottom hole static temperature ("BHST") ranging from about 60° F. to about 250° F., two-component epoxy-based resins comprising a hardenable resin component and a hardening agent component containing specific hardening agents may be preferred. For subterranean formations having a BHST ranging from about 300° F. to about 600° F., a furan-based resin may be preferred. For subterranean formations having a BHST ranging from about 200° F. to about 400° F., either a phenolic-based resin or a one-component HT epoxy-based resin may be suitable. For subterranean formations having a BHST of at least about 175° F., a phenol/phenol formaldehyde/furfuryl alcohol resin may also be suitable.

Generally, the hardenable resin may be included in the liquid hardenable resin component in an amount in the range of about 5% to about 100% by volume of the liquid hardenable resin component. In particular embodiments, the hardenable resin may be included in the liquid hardenable resin component in an amount of about 75% to about 100% by volume of the liquid hardenable resin component. It is within the ability of one skilled in the art with the benefit of this disclosure to determine how much of the liquid hardenable resin may be needed to achieve the desired results. Factors that may affect this decision include the type of liquid hardenable resin and liquid hardening agent used in a particular application.

In some embodiments, a solvent may be added to the resin to reduce its viscosity for ease of handling, mixing and transferring. However, in particular embodiments, it may be desirable not to use such a solvent for environmental or safety reasons. It is within the ability of one skilled in the art with the benefit of this disclosure to determine if and how much solvent may be needed to achieve a viscosity suitable to the subterranean conditions of a particular application. Factors that may affect this decision include geographic location of the well, the surrounding weather conditions, and the desired long-term stability of the well bore servicing fluid.

Generally, any solvent that is compatible with the hardenable resin and that achieves the desired viscosity effect may be suitable for use in the liquid hardenable resin component of the well bore servicing fluid. Suitable solvents may include, but are not limited to, polyethylene glycol, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d'limonene, fatty acid methyl esters, and combinations thereof. Selection of an appropriate solvent may be dependent on the resin composition chosen. With the benefit of this disclosure, the selection of an appropriate solvent should be within the ability of one skilled in the art. In some embodiments, the amount of the solvent used in the liquid hardenable resin component may be in the range of about 0.1% to about 30% by weight of the liquid hardenable resin component. Optionally, the liquid hardenable resin component may be heated to reduce its viscosity, in place of, or in addition to, using a solvent.

In some embodiments, the liquid hardenable resin component may also comprise an aqueous diluent or carrier fluid to reduce the viscosity of the liquid hardenable resin component and/or help to wet the weighting material. The aqueous fluids used in the consolidation fluids of the present invention may comprise fresh water, saltwater (e.g., water containing one or more salts dissolved therein), brine (e.g., saturated saltwater), seawater, or combinations thereof, and may be from any source, provided that they do not contain components that might adversely affect the stability and/or performance of the well bore servicing fluid. In some embodiments, the aqueous diluent or carrier fluid may be present in the liquid hardenable resin component in an amount from about 0.1% to about 25% by volume of the liquid hardenable resin component. In other embodiments, the aqueous diluent or carrier fluid may be present in the liquid hardenable resin component in an amount from about 0.1% to about 5% by volume of the liquid hardenable resin component.

Generally, the liquid hardenable resin component may be included in the well bore servicing composition in an amount from about 5% to about 90% by volume of the well bore servicing composition. In particular embodiments, the liquid hardenable resin component may be included in the well bore servicing composition in an amount from about 50% to about 75% by volume of the well bore servicing composition. In particular embodiments, the liquid hardenable resin component may be included in the well bore servicing composition in an amount of about 58.3% by volume of the well bore servicing composition.

The well bore servicing composition of the present invention also includes a liquid hardening agent component comprising a hardening agent and an optional silane coupling agent. As used herein, "hardening agent" refers to any substance capable of transforming the hardenable resin into a hardened, consolidated mass. Examples of suitable hardening agents include, but are not limited to, aliphatic amines, aliphatic tertiary amines, aromatic amines, cycloaliphatic amines, heterocyclic amines, amido amines, polyamides, polyethyl amines, polyether amines, polyoxyalkylene amines, carboxylic anhydrides, triethylenetetraamine, ethylene diamine, N-cocoalkyltrimethylene, isophorone diamine, N-aminophenyl piperazine, imidazoline, 1,2-diaminocyclohexane, polytheramine, diethyltoluenediamine, 4,4'-diaminodiphenyl methane, methyltetrahydrophthalic anhydride, hexahydrophthalic anhydride, maleic anhydride, polyazelaic polyanhydride, phthalic anhydride, and combinations thereof. Suitable, commercially available hardening agents may include, but are not limited to, ETHACURE® 100, available from Albemarle Corp. of Baton Rouge, La., and JEFFAMINE® D-230, available from Huntsman Corp. of The Woodlands, Tex. The hardening agent may be included in the liquid hardening agent component in an amount sufficient to at least partially harden the resin composition. In some embodiments of the present invention, the hardening agent used may be included in the liquid hardening agent component in the range of about 5% to about 100% by volume of the liquid hardening agent component. In other embodiments, the hardening agent used may be included in the liquid hardening agent component in an amount of about 50% to about 75% by volume of the liquid hardening agent component. In other embodiments, the hardening agent used may be included in the liquid hardening agent component in an amount of about 62.5% by volume of the liquid hardening agent component.

In some embodiments the hardening agent may comprise a mixture of hardening agents selected to impart particular qualities to the well bore servicing composition. For example, in particular embodiments, the hardening agent may comprise a fast-setting hardening agent and a slow-setting hardening agent. As used herein, "fast-setting hardening agent" and "slow-setting hardening agent" do not imply any specific rate at which the agents set a hardenable resin; instead, the terms merely indicate the relative rates at which the hardening agents initiate hardening of the resin. Whether a particular hardening agent is considered fast-setting or slow-setting may depend on the other hardening agent(s) with which it is used. In a particular embodiment, ETHACURE® 100 may be used as a slow-setting hardening agent and JEFFAMINE® D-230, may be used as a fast-setting hardening agent. In some embodiments, the ratio of fast-setting hardening agent to slow-setting hardening agent may be selected to achieve a desired behavior of liquid hardening agent component. For example, in some embodiments, the fast-setting hardening agent may be included in the liquid hardening agent component in a ratio of approximately 1:5, by volume, with the slow-setting hardening agent. With the benefit of this disclosure, one of ordinary skill in the art should be able to select the appropriate ratio of hardening agents for use in a particular application The liquid hardening agent component of the well bore servicing composition may also include an optional silane coupling agent. The silane coupling agent may be used, among other things, to act as a mediator to help bond the resin to weighting material, the surface of the subterranean formation, and/or the surface of the well bore. Examples of suitable silane coupling agents include, but are not limited to, N-2-(aminoethyl)-3-aminopropyltrimethoxysilane; 3-glycidoxypropyltrimethoxysilane; gamma-aminopropyltriethoxysilane; N-beta-(aminoethyl)-gamma-aminopropyltrimethoxysilanes; aminoethyl-N-beta-(aminoethyl)-gamma-aminopropyl-trimethoxysilanes; gamma-ureidopropyl-triethoxysilanes; beta-(3-4 epoxy-cyclohexyl)-ethyl-trimethoxysilane; gamma-glycidoxypropyl-trimethoxysilanes; vinyltrichlorosilane; vinyltris (beta-methoxyethoxy) silane; vinyltriethoxysilane; vinyltrimethoxysilane; 3-metacryloxypropyltrimethoxysilane; beta-(3,4 epoxycyclohexyl)-ethyltrimethoxysilane; r-glycidoxypropyltrimethoxysilane; r-glycidoxypropylmethylidiethoxysilane; N-beta-(aminoethyl)-r-aminopropyl-trimethoxysilane; N-beta-(aminoethyl)-r-aminopropylmethyldimethoxysilane; 3-aminopropyl-triethoxysilane; N-phenyl-r-aminopropyltrimethoxysilane; r-mercaptopropyltrimethoxysilane; r-chloropropyltrimethoxysilane; vinyltrichlorosilane; vinyltris (beta-methoxyethoxy) silane; vinyltrimethoxysilane; r-metacryloxypropyltrimethoxysilane; beta-(3,4 epoxycyclohexyl)-ethyltrimethoxysila; r-glycidoxypropyltrimethoxysilane; r-glycidoxypropylmethylidiethoxysilane; N-beta-(aminoethyl)-r-aminopropyltrimethoxysilane; N-beta-(aminoethyl)-r-aminopropylmethyldimethoxysilane; r-aminopropyltriethoxysilane; N-phenyl-r-aminopropyltrimethoxysilane; r-mercaptopropyltrimethoxysilane; r-chloropropyltrimethoxysilane; N[3-(trimethoxysilyl)propyl]-ethylenediamine; substituted silanes where one or more of the substitutions contains a different functional group; and combinations thereof. Generally, the silane coupling agent may be included in the liquid hardening agent component in an amount capable of sufficiently bonding the resin to the particulate. In some embodiments of the present invention, the silane coupling agent may be included in the liquid hardening agent component in the range of about 0.1% to about 95% by volume of the liquid hardening agent component. In other embodiments, the fast-setting hardening agent may be included in the liquid hardening agent component in an amount of about 5% to about 50% by volume of the liquid hardening agent component. In other embodiments, the fast-setting hardening agent may be included in the liquid hardening agent component in an amount of about 25% by volume of the liquid hardening agent component.

An optional diluent or liquid carrier fluid may also be used in the liquid hardening agent component to, among other things, reduce the viscosity of the liquid hardening agent component for ease of handling, mixing and transferring. However, in some embodiments, it may be desirable, for environmental or safety reasons, not to use a solvent. Any suitable carrier fluid that is compatible with the liquid hardening agent component and achieves the desired viscosity effects may be suitable for use in the present invention. Some suitable liquid carrier fluids are those having high flash points (e.g., above about 125° F.) because of, among other things, environmental and safety concerns; such solvents may include, but are not limited to, polyethylene glycol, butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, d' limonene, fatty acid methyl esters, and combinations thereof. In particular embodiments, selection of an appropriate liquid carrier fluid may be dependent on, inter alia, the resin composition chosen.

Generally, the liquid hardening agent component may be included in the well bore servicing composition in an amount from about 1% to about 50% by volume of the well bore servicing composition. In particular embodiments, the liquid hardening agent component may be included in the well bore servicing composition in an amount from about 5% to about 25% by volume of the well bore servicing composition. In particular embodiments, the liquid hardening agent component may be included in the well bore servicing composition in an amount of about 11.6% by volume of the well bore servicing composition. In some embodiments, the liquid hardening agent component may be included in the well bore servicing composition in an approximately 1:5 ratio, by volume, with the liquid hardenable resin component.

In particular embodiments, the amount of liquid hardening agent composition may be selected to impart a desired elasticity or compressibility to a resulting well bore plug. Generally, the lower the amount of hardening agent present in the well bore servicing composition, the greater the elasticity or compressibility of a resulting well bore plug. With the benefit of this disclosure, it should be within the skill of one or ordinary skill in the art to select an appropriate amount of hardening agent to achieve a desired elasticity or compressibility for a particular application.

The well bore servicing compositions of the present invention also comprise a weighting material. As used herein, "weighting material" refers to any particulate matter added to the well bore servicing composition to affect its buoyancy, and does not imply any particular weight, density, or specific gravity. In some embodiments, the weighting material may comprise a low-density weighting material that is sufficiently buoyant to allow the well bore servicing composition to float in fresh water, seawater, brine, and/or hydrocarbon. In other embodiments of the present invention, the weighting material may comprise a high-density weighting material that is dense enough to allow the well bore servicing composition to sink in fresh water, seawater, brine, and/or hydrocarbon. In yet other embodiments, the weighting material may comprise a mixture of low-density and high-density weighting material selected to achieve a desired buoyancy. As used herein, "low-density weighting material" refers to any suitable weighting material that has a specific gravity of less than about 1.0, whereas "high-density weighting material" refers to any suitable weighting material that has a specific gravity greater than about 1.0. Examples of suitable low-density weighting materials include, but are not limited to hollow microspheres. Examples of suitable hollow microspheres include, but are not limited to, hollow mineral glass spheres, such as "SPHERELITE™" commercially available from Halliburton Energy Services of Duncan, Okla.; silica and alumina cenospheres, such as "CENOLITE®" commercially available from Microspheres S.A. of South Africa; hollow glass microspheres, such as "SCOTCHLITE™" commercially available from the 3M Company of St. Paul, Minn.; ceramic microspheres, such as "Z-LIGHT SPHERES™" commercially available from the 3M Company of St. Paul, Minn.; polymeric microspheres, such as "EXPANCEL®" commercially available from Akzo Nobel of The Netherlands; and plastic microspheres, such as "LUBRA-BEADS®" commercially available from Halliburton Energy Services of Duncan, Okla. Examples of suitable high-density weighting materials include, but are not limited to, silica, ilmenite, hematite, barite, Portland cement, manganese tetraoxide, and combinations thereof. Suitable, commercially available high-density weighting materials include, but are not limited to, MICROSAND™, a crystalline silica weighting material, and HI-DENSE®, a hematite weighting material, both commercially available from Halliburton Energy Services, Inc. of Duncan, Okla.

The mean particulate sizes of the weighting material may generally range from about 2 nanometers to about 3000 microns in diameter; however, in certain circumstances, other mean particulate sizes may be desired and will be entirely suitable for practice of the present invention. It should be understood that the term "particulate," as used in this disclosure, includes all known shapes of materials, including substantially spherical materials, fibrous materials, polygonal materials (such as cubic materials), and mixtures thereof. In particular embodiments, the particulate size of the weighting material may be selected to impart a desired viscosity to the well bore servicing composition. Moreover, in particular embodiments, weighting materials having different particulate sizes may be mixed to achieve a desired viscosity of the well bore servicing composition.

Generally, the weighting material may be included in the well bore servicing composition in an amount from about 1% to about 60% by volume of the well bore servicing composition. In particular embodiments, the weighting material may be included in the well bore servicing composition in an amount from about 20% to about 40% by volume of the well bore servicing composition. In particular embodiments, the weighting material may be included in the well bore servicing composition in an amount of about 30% by volume of the well bore servicing composition.

In some embodiments, the well bore servicing compositions may also include swellable particles. These particles, however, are optional and need not be included within a well bore servicing composition for that composition to fall within the teachings of the present invention. As used herein, a "swellable particle" refers to any particle that swells upon contact with oil and/or an aqueous fluid (e.g., water). Swellable particles suitable for use in embodiments of the present invention may generally swell by up to about 50% of their original size at the surface. Under downhole conditions, the amount of swelling may vary depending on the conditions presented. For example, in some embodiments, the amount of swelling may be at least 10% under downhole conditions. In particular embodiments, the amount of swelling may be up to about 50% under downhole conditions. However, as those of ordinary skill in the art, with the benefit of this disclosure, will appreciate, the actual amount of swelling when the swellable particles are included in a well bore servicing composition may depend on the concentration of the swellable particles included in the composition, among other factors. In accordance with particular embodiments of the present invention, the swellable particles may be included in the well bore servicing composition, for example, to counteract the formation of cracks in a resultant well bore plug and/or micro-annulus between the well bore plug and the pipe string or the formation. In general, the swellable particles are capable of swelling when contacted by aqueous fluids and/or oil to inhibit fluid flow through the crack and/or micro-annulus. Accordingly, the swellable particles may prevent and/or reduce the loss of zonal isolation in spite of the formation of cracks and/or micro-annulus, potentially resulting in an improved annular seal for the well bore servicing compositions.

Some specific examples of suitable swellable elastomers include, but are not limited to, natural rubber, acrylate butadiene rubber, polyacrylate rubber, isoprene rubber, choloroprene rubber, butyl rubber (IIR), brominated butyl rubber (BIIR), chlorinated butyl rubber (CIIR), chlorinated polyethylene (CM/CPE), neoprene rubber (CR), styrene butadiene copolymer rubber (SBR), sulphonated polyethylene (CSM), ethylene acrylate rubber (EAM/AEM), epichlorohydrin ethylene oxide copolymer (CO, ECO), ethylene-propylene rubber (EPM and EDPM), ethylene-propylene-diene terpolymer rubber (EPT), ethylene vinyl acetate copolymer, fluorosilicone rubbers (FVMQ), silicone rubbers (VMQ), poly 2,2,1-bicyclo heptene (polynorborneane), and alkylstyrene. One example of a suitable swellable elastomer comprises a block copolymer of a styrene butadiene rubber. Examples of suitable elastomers that swell when contacted by oil include, but are not limited to, nitrile rubber (NBR), hydrogenated nitrile rubber (HNBR, HNS), fluoro rubbers (FKM), perfluoro rubbers (FFKM), tetrafluorethylene/propylene (TFE/P), isobutylene maleic anhydride. Other swellable elastomers that behave in a similar fashion with respect to oil or aqueous fluids also may be suitable for use in particular embodiments of the present invention. Furthermore, combinations of suitable swellable elastomers may also be used in particular embodiments of the present invention.

Some specific examples of suitable water-swellable polymers, include, but are not limited to, starch-polyacrylate acid graft copolymer and salts thereof, polyethylene oxide polymer, carboxymethyl cellulose type polymers, polyacrylamide, poly(acrylic acid) and salts thereof, poly(acrylic acid-co-acrylamide) and salts thereof, graft-poly(ethylene oxide) of poly(acrylic acid) and salts thereof, poly(2-hydroxyethyl methacrylate), poly(2-hydroxypropyl methacrylate), and combinations thereof. Other water-swellable polymers that behave in a similar fashion with respect to aqueous fluids also may be suitable for use in particular embodiments of the present invention. In certain embodiments, the water-swellable polymers may be crosslinked and/or lightly crosslinked. Those of ordinary skill in the art, with the benefit of this disclosure, will be able to select an appropriate swellable elastomer and/or water-swellable polymer for use in particular embodiments of the well bore servicing compositions of the present invention based on a variety of factors, including the particular application in which the composition will be used and the desired swelling characteristics.

Generally, the swellable particles may be included in the well bore servicing compositions in an amount sufficient to provide the desired mechanical properties. In some embodiments, the swellable particles may be present in the well bore servicing compositions in an amount up to about 25% by weight of the hardenable resin. In some embodiments, the swellable particles may be present in the well bore servicing compositions in a range of about 5% to about 25% by weight of the hardenable resin. In some embodiments, the swellable particles may be present in the well bore servicing compositions in a range of about 15% to about 20% by weight of the hardenable resin.

In addition, the swellable particles that may be utilized may have a wide variety of shapes and sizes of individual particles suitable for use in accordance with embodiments of the present invention. By way of example, the swellable particles may have a well-defined physical shape as well as an irregular geometry, including the physical shape of platelets, shavings, fibers, flakes, ribbons, rods, strips, spheroids, beads, pellets, tablets, or any other physical shape. In some embodiments, the swellable particles may have a particle size in the range of about 5 microns to about 1,500 microns. In some embodiments, the swellable particles may have a particle size in the range of about 20 microns to about 500 microns. However, particle sizes outside these defined ranges also may be suitable for particular applications.

In some embodiments of the present invention, additional solid materials may also be included in the well bore servicing composition to enhance the strength, hardness, and/or toughness of the resulting well bore plug or sheath. As with the swellable particles discussed above, these materials are optional and need not be included in a well bore servicing composition for that composition to fall within the teachings of the present invention. These solid materials may include both natural and man-made materials, and may have any shape, including, but not limited to, beaded, cubic, bar-shaped, cylindrical, or mixtures thereof, and may be in any form including, but not limited to flake or fiber form. Suitable materials may include, but are not limited to, cellulose fibers, carbon fibers, glass fibers, mineral fibers, plastic fibers (e.g., polypropylene and polyacrylic nitrile fibers), metallic fibers, metal shavings, Kevlar fibers, basalt fibers, wollastonite, micas (e.g., phlogopites and muscovites), and mixtures thereof.

Carbon fibers suitable for use in particular embodiments of the present invention include high tensile modulus carbon fibers which have a high tensile strength. In some embodiments, the tensile modulus of the carbon fibers may exceed 180 GPa, and the tensile strength of the carbon fibers may exceed 3000 MPa. Generally, the fibers may have a mean length of about 1 mm or less. In some embodiments, the mean length of the carbon fibers is from about 50 to about 500 microns. In particular embodiment, the carbon fibers have a mean length in the range of from about 100 to about 200 microns. In particular embodiments, the carbon fibers may be milled carbon fibers. Suitable, commercially available carbon fibers include, but are not limited to, "AGM-94" and "AGM-99" carbon fibers both available from Asbury Graphite Mills, Inc., of Asbury, N.J.

Metallic fibers suitable for use in particular embodiments of the present invention may include non-amorphous (i.e., crystalline) metallic fibers. In particular embodiments, the non-amorphous metallic fibers may be obtained by cold drawing steel wires (i.e., steel wool). Suitable metallic fibers include, but are not limited to, steel fibers. Generally, the length and diameter of the metallic fibers may be adjusted such that the fibers are flexible and easily dispersible in the well bore servicing composition, and the well bore servicing composition is easily pumpable.

These additional solid materials may be present in the well bore servicing composition of the present invention individually or in combination. Additionally, the solid materials of the present invention may be present in the well bore servicing composition in a variety of lengths and/or aspect ratios. A person having ordinary skill in the art, with the benefit of this disclosure, will recognize the mixtures of type, length, and/or aspect ratio to use to achieve the desired properties of a well bore servicing composition for a particular application.

In particular embodiments of the present invention, the liquid hardenable resin component, liquid hardening agent component, weighting material, and/or any optional swellable particles or solid materials may be either batch-mixed or mixed on-the-fly. As used herein, the term "on-the-fly" is used herein to mean that a flowing stream is continuously introduced into another flowing stream so that the streams are combined and mixed while continuing to flow as a single stream as part of the on-going treatment. Such mixing may also be described as "real-time" mixing. On-the-fly mixing, as opposed to batch or partial batch mixing, may reduce waste and simplify subterranean treatments. This is due, in part, to the fact that, in particular embodiments, if the components are mixed and then circumstances dictate that the subterranean treatment be stopped or postponed, the mixed components may become unusable. By having the ability to rapidly shut down the mixing of streams on-the-fly in such embodiments, unnecessary waste may be avoided, resulting in, inter alia, increased efficiency and cost savings. However, other embodiments of the present invention may allow for batch mixing of the well bore servicing composition. In these embodiments, the well bore servicing composition may be sufficiently stable to allow the composition to be prepared in advance of its introduction into the well bore without the composition becoming unusable if not promptly introduced into the well bore.

Generally, the well bore servicing compositions of the present invention may be used for any purpose. In some embodiments, the well bore servicing composition may be used to service a well bore that penetrates a subterranean formation. It is to be understood that "subterranean formation" encompasses both areas below exposed earth and areas below earth covered by water such as ocean or fresh water. Servicing a well bore includes, without limitation, positioning the well bore servicing composition in the well bore to isolate the subterranean formation from a portion of the well bore; to support a conduit in the well bore; to plug a void or crack in the conduit; to plug a void or crack in a cement sheath disposed in an annulus of the well bore; to plug a perforation; to plug an opening between the cement sheath and the conduit; to prevent the loss of aqueous or nonaqueous drilling fluids into loss circulation zones such as a void, vugular zone, or fracture; to plug a well for abandonment purposes; a temporary plug to divert treatment fluids; as a chemical packer to be used as a fluid in front of cement slurry in cementing operations; and to seal an annulus between the well bore and an expandable pipe or pipe string. For instance, the well bore servicing composition may withstand substantial amounts of pressure, e.g., the hydrostatic pressure of a drilling fluid or cement slurry, without being dislodged or extruded. The well bore servicing composition may set into a flexible, resilient and tough material, which may prevent further fluid losses when circulation is resumed. The well bore servicing composition may also form a non-flowing, intact mass inside the loss-circulation zone. This mass plugs the zone and inhibits loss of subsequently pumped drilling fluid, which allows for further drilling.

In some embodiments, the well bore servicing compositions may be placed into an annulus of the well bore and allowed to set such that it isolates the subterranean formation from a different portion of the well bore. The well bore servicing compositions may thus form a barrier that prevents fluids in that subterranean formation from migrating into other subterranean formations. Within the annulus, the fluid also serves to support a conduit, e.g., casing, in the well bore. In other embodiments, the well bore servicing composition may be positioned in a well bore in a multilateral well bore configuration including at least two principal well bores connected by one or more ancillary well bores. In secondary cementing, often referred to as squeeze cementing, the well bore servicing composition may be strategically positioned in the well bore to plug a void or crack in the conduit, to plug a void or crack in the hardened sealant (e.g., cement sheath) residing in the annulus, to plug a relatively small opening known as a microannulus between the hardened sealant and the conduit, and so forth, thus acting as a sealant composition.

In particular embodiments, the well bore servicing compositions of the present invention may be used in primary cementing operations, to cement a pipe string (e.g., casing, liners, expandable tubulars, etc.) in place. In such a primary cementing operation, a well bore servicing composition may be pumped into an annulus between the walls of the well bore and the exterior surface of the pipe string disposed therein. The well bore servicing composition may set in the annular space, thereby forming an annular sheath of hardened, substantially impermeable resin that may support and position the pipe string in the well bore and may bond the exterior surface of the pipe string to the subterranean formation. Among other things, the sheath surrounding the pipe string may function to prevent the migration of fluids in the annulus, as well as protecting the pipe string from corrosion.

Generally, the well bore servicing compositions of the present invention may be introduced into a well bore using any suitable technique. For example, in some embodiments of the present invention, a well bore servicing compositions may be introduced into a well bore by drilling an interception well bore to "intercept" an existing well bore. Once communication with the existing well is established, the well bore servicing composition of the present invention may then be pumped into the well bore as is known in the art. However, if communication cannot be established, the well bore servicing composition may still be introduced into the existing well bore by "lubricating" the existing well bore. In this process, the well bore servicing composition may be injected into the existing well bore even though communication has not been established. This results in the compression of the fluids and material inside the well bore. Once the composition has been introduced into the well bore to be serviced, the buoyancy, density, or specific gravity of the weighting material in the composition may be used to facilitate the placement of the composition into a desired location within the well bore.

In some embodiments, the present invention provides a method of servicing a well bore comprising providing a hydrophobic well bore servicing composition comprising a liquid hardenable resin, a hardening agent, and a weighting material selected to impart a desired first density to the well bore servicing composition; introducing the well bore servicing composition into a well bore comprising a well bore fluid having a second density; allowing the well bore servicing composition to migrate through the well bore fluid to a desired location in the well bore based at least in part upon a difference between the first and second densities; and allowing the liquid hardenable resin to at least partially harden to form a well bore plug at the desired location in the well bore.

In another embodiment, the present invention provides a method of servicing a well bore comprising providing a hydrophobic well bore servicing composition comprising a liquid hardenable resin, a hardening agent, and a low-density weighting material; introducing the well bore servicing composition into a well bore below a desired location, the well bore comprising a well bore fluid; allowing the well bore servicing composition to migrate through the well bore fluid to the desired location in the well bore; and allowing the liquid hardenable resin to at least partially harden to form a well bore plug at the desired location in the well bore.

In yet another embodiment, the present invention provides a method of servicing a well bore comprising providing a hydrophobic well bore servicing composition comprising a liquid hardenable resin, a hardening agent, and a high-density weighting material; introducing the well bore servicing composition into a well bore above a desired location, the well bore comprising a well bore fluid; allowing the well bore servicing composition to migrate through the well bore fluid to the desired location in the well bore; and allowing the liquid hardenable resin to at least partially harden to form a well bore plug at the desired location in the well bore.

In another embodiment, the present invention provides a method comprising providing a hydrophobic well bore servicing composition comprising a liquid hardenable resin, a hardening agent, and a weighting material; introducing the well bore servicing composition into an annulus between a pipe string and a subterranean formation; and allowing the well bore servicing composition to at least partially harden within the annulus.

To facilitate a better understanding of the present invention, the following examples of specific embodiments are given. In no way should the following examples be read to limit or define the entire scope of the invention.

EXAMPLE 1

In order to illustrate the compressive strengths and pumping properties of particular embodiments of the present invention, various samples were prepared and tested using two different compositions comprising a liquid hardenable resin and either a low- or high-density weighting material.

A low-density composition was prepared by mixing 25.0 cc FDP-S891A, a liquid hardenable resin commercially available from Halliburton Energy Services of Duncan, Okla.; 0.5 cc water; and 7 g 4000# 3M™ Beads, a low-density weighting material commercially available from the 3M Company of St. Paul, Minn., in a Waring blender at 3000 rpm for approximately 3 minutes. A hardening agent composition comprising 2.5 cc ETHACURE® 100, 0.5 cc JEFFAMINE® D-230, and 1.0 cc silane was added to each sample, and the resulting mixtures were mixed in the Waring blender at 3000 rpm for an additional minute. After mixing, the low-density composition had a weight of 6.8 ppg.

Similarly, a high-density composition was prepared by mixing 25.0 cc FDP-S891A; 0.5 cc water; and 21.7 g MICROSAND™ in a Waring blender at 3000 rpm for approximately 3 minutes. A hardening agent composition comprising 2.5 cc ETHACURE® 100, 0.5 cc JEFFAMINE® D-230, and 1.0 cc silane was added to each sample, and the resulting mixtures were mixed in the Waring blender at 3000 rpm for an additional minute. After mixing, the high-density composition had a weight of 12.0 ppg.

Using samples of these two compositions at either 70 Bc or 100 Bc, pump tests were performed in an atmospheric consistomer at 125° F. and 152° F. to determine how long the compositions would remain viscous enough to pump. The results of these tests are shown below in Table 1.

TABLE 1

| Sample No. | Composition Density | Temp. (° F.) | Consistency (Bc) | Pump Time (Hrs) |
|---|---|---|---|---|
| 1 | low | 125 | 70 | 4.66 |
| 2 | low | 125 | 100 | 5.5 |
| 3 | low | 152 | 70 | 3 |
| 4 | low | 152 | 100 | 4.33 |
| 5 | high | 125 | 70 | 7 |
| 6 | high | 125 | 100 | Over 7 |
| 7 | high | 152 | 70 | 2.8 |
| 8 | high | 152 | 100 | 3.5 |

As illustrated in Table 1, the lower the temperature, the longer the composition remained pumpable. For example, the low-density composition at 125° F. and 70 Bc remained pumpable for 4.66 hours, whereas at 152° F. and 70 Bc it only remained pumpable for 3 hours. Similarly, the high-density composition at 125° F. and 70 Bc remained pumpable for 7 hours, whereas at 152° F. and 70 Bc it only remained pumpable for 2.8 hours. Also, as shown in Table 1, the greater the consistency (i.e., the higher the Bearden value) of the composition, the longer the composition remained pumpable.

EXAMPLE 2

The compressive strengths and compressibility of the two compositions were also tested using samples prepared using the same low- and high-density compositions from Example 1. Each sample was poured into a 4-inch-long cylinder having a 2-inch inner diameter, and the samples were allowed to cure for either 1, 2, 3, or 7 days in a water bath at atmospheric pressure at either 125° F. or 152° F. The compressive strength and compressibility (until failure) of the resulting plugs was then tested. The results of these tests are shown below in Table 2.

TABLE 2

| Sample No. | Composition Density | Cure Time (days) | Temp. (° F.) | Compressive Strength (psi) | Compressibility (%) |
|---|---|---|---|---|---|
| 1 | low | 1 | 125 | Not Cured | N.A. |
| 2 | low | 1 | 152 | 151.7 | 18.0 |
| 3 | low | 2 | 125 | 139 | 24.0 |
| 4 | low | 3 | 125 | 326 | 18.9 |
| 5 | low | 3 | 152 | 733 | 18.6 |
| 6 | low | 7 | 125 | 1129 | 26.7 |
| 7 | low | 7 | 152 | 2430 | 26.7 |
| 8 | high | 3 | 125 | 1358 | 42.0 |
| 9 | high | 3 | 152 | 4090 | 37.8 |

As shown in Table 2, increasing the curing time and/or curing temperature of the samples resulted in increasingly higher compressive strengths. For example, increasing the curing time of low-density composition from 2 days to 3 days to 7 days, while maintaining a constant curing temperature of 125° F., resulted in compressive strengths of 139 psi, 326 psi, and 1129 psi, respectively. Similarly, increasing the curing temperature from 125° F. to 152° F. on the samples cured 3 days resulted in a compressive strength of 733 psi at 152° F. as opposed to 326 psi at 125° F. for the low-density composition, and a compressive strength of 4090 psi at 152° F. as opposed to 1358 psi at 125° F. for the high-density composition. As also shown in Table 2, each of the resultant plugs illustrated compressibilities of at least 18% before failure. In particular, sample no. 8 exhibited a compressibility as high as 42% before failure.

EXAMPLE 3

Lastly, the shear bond strength of the low-density composition was tested by placing each of three samples of the low-density composition into an annulus formed between an 2-inch outer pipe and 1-inch inner pipe having inner or outer surface areas, respectively, of approximately 20 square inches. Two of the samples were then cured for 7 days at either 125° F. or 152° F. at atmospheric pressure. The other sample was cured for 7 days at 152° F. at 2000 psi. The shear bond strengths of the compositions were then tested by applying a torque to the inner pipe until the composition could no longer resist the movement of the pipe. The results of these tests are shown below in Table 3.

TABLE 3

| Sample No. | Cure Pressure (psi) | Cure Temp. (° F.) | Cure Time (days) | Shear Bond Strength (psi) |
|---|---|---|---|---|
| 1 | 14.7 | 125 | 7 | 200 |
| 2 | 2000 | 152 | 7 | 681 |
| 3 | 14.7 | 152 | 7 | 201 |

As shown in Table 3, each sample illustrated a shear bond strength of at least 200 psi. In fact, the sample cured at 2000 psi illustrated a shear bond strength of 681 psi. Additionally, the difference in cure temperatures between sample nos. 1 and 3 did not significantly affect their shear bond strengths.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. While numerous changes may be made by those skilled in the art, such changes are encompassed within the spirit of this invention as defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method of servicing a well bore comprising:
   providing a hydrophobic well bore servicing composition comprising a liquid hardenable resin, a hardening agent, and a weighting material selected to impart a desired first density to the well bore servicing composition;
   introducing the well bore servicing composition into a well bore comprising a well bore fluid having a second density;
   allowing the well bore servicing composition to migrate through the well bore fluid to a desired location in the well bore based at least in part upon a difference between the first and second densities; and
   allowing the liquid hardenable resin to at least partially harden to form a well bore plug at the desired location in the well bore.

2. The method of claim 1, wherein the liquid hardenable resin comprises a component selected from the group consisting of epoxy-based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, and acrylate resins.

3. The method of claim 1, wherein the hardening agent comprises a component selected from the group consisting of aliphatic amines, aliphatic tertiary amines, aromatic amines, cycloaliphatic amines, heterocyclic amines, amido amines, polyamides, polyethyl amines, polyether amines, polyoxyalkylene amines, carboxylic anhydrides, triethylenetetraamine, ethylene diamine, N-cocoalkyltrimethylene, isophorone diamine, Naminophenyl piperazine, imidazoline, 1,2-diaminocyclohexane, polytheramine, diethyltoluenediamine, 4,4'-diaminodiphenyl methane, methyltetrahydrophthalic anhydride, hexahydrophthalic anhydride, maleic anhydride, polyazelaic polyanhydride, and phthalic anhydride.

4. The method of claim 1, wherein the weighting material comprises a component selected from the group consisting of hollow mineral glass spheres, hollow glass microspheres, cenospheres, ceramic microspheres, polymeric microspheres, plastic microspheres, silica, ilmenite, hematite, barite, Portland cement, and manganese tetraoxide.

5. The method of claim 1, wherein the well bore servicing composition comprises swellable particles.

6. The method of claim 1, wherein the well bore servicing composition comprises a component selected from the group consisting of cellulose fibers, carbon fibers, glass fibers, mineral fibers, plastic fibers, metallic fibers, metal shavings, Kevlar fibers, basalt fibers, wollastonite, and micas.

7. The method of claim 1, wherein the weighting material comprises a low-density weighting material.

8. The method of claim 7, wherein the weighting material comprises a component selected from the group consisting of hollow mineral glass spheres, hollow glass microspheres, cenospheres, ceramic microspheres, polymeric microspheres, and plastic microspheres.

9. The method of claim 7, wherein the weighting material is placed below a desired location in the well bore comprising a well bore fluid.

10. The method of claim 1, wherein providing the well bore servicing composition comprises batch-mixing the liquid hardenable resin, hardening agent, and weighting material to form the well bore servicing composition.

11. The method of claim 1, wherein the weighting material comprises a high-density weighting material.

12. The method of claim 11, wherein the weighting material comprises a component selected from the group consisting of silica, ilmenite, hematite, barite, Portland cement, and manganese tetraoxide.

13. The method of claim 11, wherein the weighting material is placed above a desired location in the well bore comprising a well bore fluid.

* * * * *